Patented Oct. 28, 1952

2,615,868

UNITED STATES PATENT OFFICE 2,615,868

COPOLYMERS OF VINYLIDENE CYANIDE WITH STYRENE AND SUBSTITUTED STYRENES

Floyd F. Miller, Akron, Ohio, assignor to The B. F. Goodrich Company, New York, N. Y., a corporation of New York No Drawing. Application September 13, 1949, Serial No. 115,564

16 Claims. (Cl. 260—78.5)

This invention relates to the preparation of novel copolymers of vinylidene cyanide with styrene and substituted styrenes, which copolymers are extremely useful in the preparation of filaments and films.

In U. S. Patent 2,476,270, to Alan E. Ardis, and in copending applications, Serial No. 63,434, filed December 3, 1948, now U. S. Patent 2,502,412, and Serial No. 79,712, filed March 4, 1949, now U. S. Patent 2,514,387, novel methods for the preparation of monomeric vinylidene cyanide are disclosed. In another copending application, Serial No. 11,336, filed February 26, 1948, methods for the preparation of useful homo polymers of vinylidene cyanide are disclosed.

Monomeric vinylidene cyanide is a clear liquid at room temperature and a crystalline solid at 0° C. It melts in the range of 6.0° C. to 9.7° C., depending on purity, with purest samples melting at 9.0° C. to 9.7° C., and it boils at 40° C. at a reduced pressure of 5 mm. of mercury. It is quite unstable because of its extreme sensitivity to water, undergoing on contact with water at room temperature an instantaneous homopolymerization reaction to give a solid, water-insoluble resin. When it is allowed to stand at room temperature in admixture with butadiene-1,3, it reacts therewith to give solid 4,4-dicyanocyclohexene.

It has now been discovered that when monomeric vinylidene cyanide of the above physical and chemical characteristics is copolymerized with styrene and substituted styrenes, either with or without the use of a free radical catalyst and in a manner such that the polymerization charge contains from 5 to 95 mole per cent of vinylidene cyanide new and highly useful copolymers are obtained.

These copolymers are essentially 1:1 alternating copolymers, that is copolymers possessing the structure:

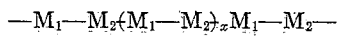

wherein each $M_1$ is a vinylidene cyanide unit

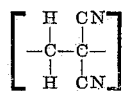

and each $M_2$ is a unit of styrene or a substituted styrene

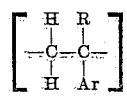

and $x$ is a number, preferably from 130 to 15,000. The fact that the copolymers thus obtained are 1:1 alternating copolymers is determined by analysis of the copolymer and by the following copolymerization equation of F. M. Lewis, C. Walling et al., Journal of the American Chemical Society, 70 1519 (1948):

$$\frac{d(M_1)}{d(M_2)} = \frac{(M_1)}{(M_2)} \cdot \frac{r_1(M_1)+(M_2)}{r_2(M_2)+(M_1)}$$

wherein $M_1$ = Concentration of unreacted monomer $M_1$
$M_2$ = Concentration of unreacted monomer $M_2$
$r_1$ = ratio of the rate constants for the reaction of an $M_1$ type radical with $M_1$ and $M_2$ respectively
$r_2$ = ratio of the rate constants for the reaction of an $M_2$ type radical with $M_2$ and $M_1$ respectively When the product of $r_1$ and $r_2$ (the values of $r_1$ and $r_2$ being determined by solving the equation for $r_1$ and $r_2$) is equivalent to zero, a 1:1 alternating copolymer is formed, that is, a copolymer having the

structure shown hereinabove for the copolymers of vinylidene cyanide with styrenes and substituted styrenes. That these copolymers possess the 1:1 alternating structure is demonstrated by the fact that when $M_1$ is vinylidene cyanide and $M_2$ is styrene, $r_1=0.0459$ and $r_2=0.0$; therefore the product of $r_1$ and $r_2$ is 0.

It is highly surprising that vinylidene cyanide will polymerize with styrene and various substituted styrenes to give the essentially 1:1 alternating copolymers, since almost without exception monomer pairs exhibit a very strong tendency to polymerize randomly rather than to form the alternating type copolymer of this invention, this being especially true of vinyl and vinylidene compounds. In fact, it has heretofore been believed that in order to get a 1:1 alternating copolymer it is necessary that the system contain at least one monomer that does not polymerize by itself to give a high molecular weight polymer.

Thus, it is all the more surprising that vinylidene cyanide and styrene type monomers, both of which polymerize readily by themselves, would form the essentially 1:1 alternating type copolymer.

The compounds which are polymerized with vinylidene cyanide in accordance with this invention are styrene and substituted styrenes of the general formula

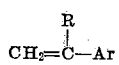

wherein Ar is an aromatic radical in which all the hydrogen atoms are attached to carbon atoms and R is a member of the class consisting of hydrogen atoms and alkyl radicals, preferably those alkyl radicals which contain from 1 to 4 carbon atoms. Included within this class of compounds are styrene, which, because of its low cost and availability is preferably utilized and substituted styrene such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, para-methylstyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4 - dichlorostyrene, 2,4,5 - trichlorostyrene, dichloro-monofluorostyrenes and the like.

The polymerization itself may be carried out in several different ways. One preferred method consists in first dissolving the vinylidene cyanide and the styrene or substituted styrene in benzene or other aromatic solvent such as toluene, methyl toluene, trichloro benzene, or the like, preferably in an amount such that the solvent comprises approximately 30 to 80% by weight of the total solution. This solution is then maintained at a temperature of about −15° C. to 100° C. whereupon polymerization occurs to form the desired copolymer as a white powder of small particle size, or a catalyst may be included in the solution before the heating step, in which event the polymerization is accelerated and slightly higher conversions are obtained. The copolymer thus formed may be separated from the polymerization medium simply by filtering, or if desired the polymerization medium may be removed by an evaporation process.

A second method of polymerization consists in agitating the monomers in a liquid aliphatic hydrocarbon (which are non-solvents for vinylidene cyanide), for example, hexane or heptane, and heating in the presence or absence of a polymerization catalyst whereupon the copolymer forms and may be separated from the polymerization medium by filtering or by evaporating the medium. It is important when utilizing the method that the liquid aliphatic hydrocarbon must be free from impurities which initiate the ionic polymerization of vinylidene cyanide.

Alternatively, the polymerization may be carried out without the use of a solvent or other liquid medium for the monomers, that is, simply by heating and agitating a mixture of the monomers, with or without the use of a polymerization catalyst. Also, the polymerization may be effected at temperatures as low as −15° C. or lower or as high as 100° C. or even higher regardless of whether or not a catalyst is utilized.

It is to be understood, of course, that regardless of the polymerization method utilized the polymerization should be stopped before either of the monomers is entirely consumed, in order that an essentially 1:1 alternating copolymer will be obtained. Otherwise, when either of the monomers is completely used up, the product will contain straight polymers obtained by polymerization of the remaining monomer. Accordingly, it is often desirable to add, continuously or intermittently, fresh quantities of one or both of the monomers, and also of catalyst and solvent, if desired, to the polymerization mixture during the course of the polymerization, thus taking fullest advantage of the capacity of the equipment and in effect operating a continuous or semi-continuous process.

Catalysts which are suitable for use in the polymerization include the peroxygen compounds such as silver peroxide, the perborates, the percarbonates, benzoyl peroxide, caproyl peroxide, lauroyl peroxide, acetone peroxide, acetyl benzoyl peroxide, cumene hydroperoxide, o,o′-dibromobenzoyl peroxide, o,o′-dichlorobenzoyl peroxide, caprylyl peroxide, pelargonyl peroxide, tertiary butyl hydroperoxide, tetralinperoxide and the like. In general, from .01 to .1% by weight of the catalyst is utilized, although smaller or larger amounts may be utilized if desired. By regulating the amount of the catalyst it is possible to control very accurately the molecular weight of the copolymer. For instance, to obtain a high-molecular weight copolymer, a small quantity of catalyst is used, while low molecular weight copolymers are obtained by the use of large amounts of catalyst.

The following examples illustrate the preparation of copolymers of vinylidene cyanide with styrene and substituted styrenes in accordance with this invention, but are not to be construed as a limitation upon the scope thereof, for there are, of course, numerous possible variations and modifications. In the examples all parts are by weight.

EXAMPLE I 0.2575 part (21.1 mole percent) of vinylidene cyanide and 1.2849 parts of styrene are dissolved in 0.7588 part of benzene and the temperature of the solution is maintained at about 20° C. Within 5 minutes the solution is cloudy and in 20 minutes a large mass of copolymer has precipitated. By analysis it is determined that the copolymer contains 51 mole percent vinylidene cyanide. The copolymer thus obtained softens after being heated at 175° C. for 30 minutes and remains unaffected after 24 hours immersion in a strong alkaline solution.

EXAMPLE II

A charge of 57.6 mole percent of vinylidene cyanide and 42.4 mole percent (2 parts) of styrene is made up in 18 parts of benzene at room temperature. After 100 minutes the copolymer which has formed is removed by filtering and is determined by analysis to contain 15.4 percent nitrogen or 51.0 mole percent vinylidene cyanide.

EXAMPLE III

A solution comprising 0.5 part (57.6 mole percent) of vinylidene cyanide and 0.5 part of styrene is prepared and the solution divided into two equal portions. To one portion 0.0027 part of o,o′-dichlorobenzoyl peroxide is added, the second portion being used as a control. The two portions are then placed in a 48° C. oven. The catalyzed system shows the first copolymer formation and after 18 hours an 86% conversion (based on total weight of monomers charged) is obtained as compared with a 66% conversion obtained with the uncatalyzed system. The properties of the two copolymers are substantially the same. The copolymer obtained from the catalyzed system analyzes 15.90 percent nitrogen or 51.4 mole percent vinylidene cyanide.

EXAMPLE IV

A copolymer is prepared by polymerizing 33 parts by weight of a 1 to 5 solution of vinylidene cyanide and styrene (16.7 mole percent vinylidene cyanide) in 67 parts benzene at 0° C. The copolymer thus obtained analyzes 15.82 percent nitrogen or 51.2 mole percent vinylidene cyanide.

EXAMPLE V

A charge is prepared by dissolving 0.12 part styrene and 0.90 part vinylidene cyanide (91 mole percent vinylidene cyanide) in 9.0 parts of benzene and the resulting solution is divided into two portions; to one portion 0.09 part of o,o'-dichlorobenzoyl peroxide is added and the second portion is maintained as a control. The two portions are then heated at 45° C. for 24 hours. The copolymers obtained from both portions of the charge analyze 54.6 mole percent vinylidene cyanide and have similar physical properties.

EXAMPLES VI TO XIV

A series of nine vinylidene cyanide 2,5-dichlorostyrene copolymers are prepared by dissolving the monomers in benzene (except in Examples XIII and XIV where no benzene is used), and adding o,o-dichlorobenzoyl peroxide as the polymerization catalyst (except in Examples XI, XII, XIII and XIV, where no catalyst is utilized). The temperature of the mixture is maintained at 40° C., whereupon polymerization occurs to form the essentially 1:1 alternating copolymer. The charging ratios, conversions obtained, analysis of the polymer and other pertinent data are shown in Table I.

EXAMPLE XV

One part of monomeric vinylidene cyanide is dissolved in 3 parts alpha-methyl styrene and 3 parts of benzene. 0.0027 part of o,o'-dichlorobenzoyl peroxide is added slowly to the solution of the monomers, whereupon polymerization takes place and the copolymer precipitates from the solution and is filtered and washed with benzene. The copolymer thus obtained analyzes 51.4 mole percent vinylidene cyanide, melts sharply at 175° C. to 178° C. and is substantially unaffected by acids or bases.

When other substituted styrenes selected from those disclosed hereinabove are substituted for styrene, methyl styrene, or 2,5-dichlorostyrene in the above examples, the copolymers obtained possess properties generally equivalent to the vinylidene cyanide-styrene copolymers. Likewise, when the polymerization is carried out according to the other methods described hereinabove, or using other of the peroxygen catalysts disclosed, excellent results are achieved.

The copolymers which are prepared according to this invention are characterized by being soluble in dimethyl formamide, acetone and hot cyclohexanone. They are insoluble in benzene, toluene, ethers and alcohols.

As disclosed hereinabove, the copolymers of this invention are extremely valuable in the preparation of solutions from which can be spun filaments of any desired size and possessing unusually high tensile strengths, excellent resistance to the action of alkalis and acids, as well as many other advantageous properties. For example, a solution of the copolymer obtained in Example I in dimethyl formamide is prepared and spun through a spinneret into a water bath, and "hot stretched" by a method whereby the filament is stretched in a hot zone in a series of steps, a process disclosed in a copending application, Serial No. 113,018, filed August 29, 1949. The filament thus prepared has a high tensile strength, low elongation at break, and is neither acid nor alkaline sensitive. In addition to the use of dimethyl formamide as the solvent for the copolymer, other of the solvents listed in the foregoing paragraph may also advantageously be used. Also, since the copolymers of this invention are characterized by having a definite softening point, they are useful in the preparation of molded objects, and may be melt spun or cast into excellent films.

Although specific examples of the invention have been herein described, it is not intended to limit the invention solely thereto, but to include all of the variations and modifications falling within the spirit and scope of the appended claims.

I claim:

1. A copolymer of monomeric vinylidene cyanide and a compound of the formula

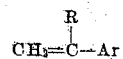

wherein Ar is an aromatic radical in which all the hydrogen atoms are attached to carbon atoms and R is a member of the class consisting of hydrogen atoms and alkyl radicals, said copolymer possessing essentially the structure

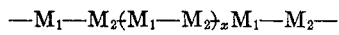

Table I

| Example No. | VI | VII | VIII | IX | X | XI | XII | XIII | XIV |
|---|---|---|---|---|---|---|---|---|---|
| Parts 2,5-dichlorostyrene in monomer charge | 8.0 | 7.0 | 6.0 | 4.0 | 1.0 | 5.0 | 1.0 | 8.0 | 1.0 |
| Mole percent 2,5-dichlorostyrene in monomer charge | 90.0 | 70.0 | 50.0 | 30.0 | 10.0 | 90.0 | 10.0 | 90.0 | 10.0 |
| Parts vinylidene cyanide | 0.39 | 1.35 | 2.69 | 4.18 | 4.05 | 0.25 | 4.05 | 0.39 | 4.05 |
| Mole percent vinylidene cyanide in monomer charge | 10.0 | 30.0 | 50.0 | 70.0 | 90.0 | 10.0 | 90.0 | 10.0 | 90.0 |
| Parts benzene | 25.2 | 25.0 | 26.1 | 24.6 | 15.0 | 15.7 | 17.0 | 0.0 | 0.0 |
| Weight percent benzene | 75.0 | 75.0 | 75.0 | 75.0 | 75.00 | 75.0 | 75.0 | 0.0 | 0.0 |
| Parts catalyst | 0.084 | 0.084 | 0.087 | 0.082 | 0.050 | 0.0 | 0.0 | 0.0 | 0.0 |
| Weight percent catalyst based on total weight of monomers | 0.1 | 0.1 | 0.1 | 0.1 | 0.1 | 0.0 | 0.0 | 0.0 | 0.0 |
| Time (hours) | 3.5 | 2.0 | 2.0 | 2.0 | 9.3 | 9.3 | 9.3 | 2.0 | 2.0 |
| Percent conversion (based on total weight of monomers charged) | 1.8 | 2.1 | 4.7 | 4.0 | 14.0 |  | 10.0 | 4.8 | 10.6 |
| Mole percent vinylidene cyanide in polymer: |  |  |  |  |  |  |  |  |  |
| (a) based on N analysis | 43.8 | 48.5 | 49.3 | 48.5 | 49.5 |  | 48.9 | 46.0 | 51.0 |
| (b) based on cl analysis | 45.8 | 48.5 | 49.4 | 51.7 | 54.2 |  | 54.3 | 47.6 | 53.6 | wherein each $M_1$ represents the vinylidene cyanide unit of the structure

each $M_2$ represents the unit of the structure

and $x$ represents a number, said copolymer being a resinous heat-softenable solid which is soluble at room temperature in dimethyl formamide, but which is insoluble at room temperature in each of alcohol, benzene, and ether, and the monomeric vinylidene cyanide entering into said copolymer to produce the vinylidene cyanide units being a liquid at room temperature and a crystalline solid at 0° C., having a melting point when in purest form, of substantially 9.0° C. to 9.7° C., and being characterizable chemically by the ability to undergo on contact with water at room temperature an instantaneous homopolymerization reaction to give a solid water-insoluble resin and by the ability to react at room temperature with butadiene-1,3 to give solid 4,4-dicyanocyclohexene.

2. The copolymer of claim 1 wherein the radical R represents a hydrogen atom.

3. A copolymer of claim 1 wherein the radical R represents an alkyl radical.

4. The copolymer of claim 1 wherein the compound of the structure

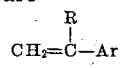

is styrene.

5. The copolymer of claim 1 wherein the compound of the structure

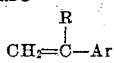

is alpha-methylstyrene.

6. The copolymer of claim 1 wherein the compound of the structure

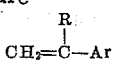

is 2,5-dichlorostyrene.

7. The method which comprises preparing a liquid medium containing monomeric vinylidene cyanide, said monomeric vinylidene cyanide being characterizable chemically by the ability to undergo on contact with water at room temperature an instantaneous homopolymerization reaction to give a solid, water-insoluble resin, and by the ability to react with butadiene at room temperature to give solid 4,4-dicyano cyclohexene, admixing said liquid medium with a compound of the structure

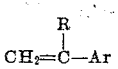

wherein Ar is an aromatic radical in which all the hydrogen atoms are attached to carbon atoms and R is a member of the class consisting of hydrogen atoms and alkyl radicals, in an amount such that the mixture contains from 5 to 95 mole per cent monomeric vinylidene cyanide, and with a peroxygen catalyst, maintaining the resulting mixture at a temperature of −15° C. to 100° C., thereby to form a solid, resinous copolymer of vinylidene cyanide and said compound of the structure

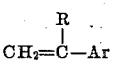

said copolymer possessing essentially the structure

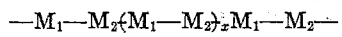

wherein each $M_1$ represents the vinylidene cyanide unit of the structure

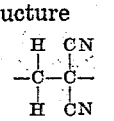

each $M_2$ represents a unit of the structure

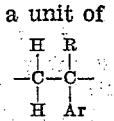

and $x$ represents a number.

8. The method which comprises preparing a liquid medium containing monomeric vinylidene cyanide, said monomeric vinylidene cyanide being characterizable chemically by the ability to undergo on contact with water at room temperature an instantaneous homopolymerization reaction to give a solid, water-insoluble resin, and by the ability to react with butadiene at room temperature to give solid 4,4-dicyano cyclohexene, admixing said liquid medium with a compound of the structure

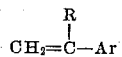

wherein Ar is an aromatic radical in which all the hydrogen atoms are attached to carbon atoms and R is a member of the class consisting of hydrogen atoms and alkyl radicals, in an amount such that the mixture contains from 5 to 95 mole per cent monomeric vinylidene cyanide, and maintaining the resulting mixture at a temperature of −15° C. to 100° C., thereby to form a solid, resinous copolymer of vinylidene cyanide and said compound of the structure

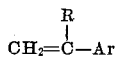

said copolymer possessing essentially the structure

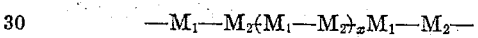

wherein each $M_1$ represents the vinylidene cyanide unit of the structure

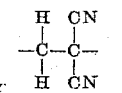

each $M_2$ represents a unit of the structure

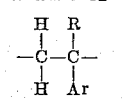

and $x$ represents a number.

9. The method of claim 8 wherein the liquid medium containing monomeric vinylidene cyanide consists of monomeric vinylidene cyanide dissolved in an organic solvent which is inert thereto.

10. The method of claim 9 wherein the compound of the structure

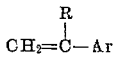

is styrene and the organic solvent is a liquid hydrocarbon.

11. The method of claim 10 wherein the liquid hydrocarbon is benzene.

12. The method of claim 9 wherein the compound of the structure

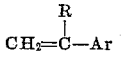

is alpha-methylstyrene and the organic solvent is a liquid hydrocarbon.

13. The method of claim 12 wherein the liquid hydrocarbon is benzene.

14. The method of claim 9 wherein the compound of the structure

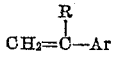

is 2,5-dichlorostyrene and the organic solvent is a liquid hydrocarbon.

15. The method of claim 14 wherein the liquid hydrocarbon is benezene.

16. A synthetic resinous filament comprising a copolymer of vinlidene cyanide and styrene, said copoymer possessing essentially the structure

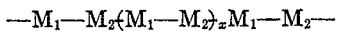

wherein each $M_1$ represents the vinylidene cyanide unit of the structure

each $M_2$ represents a styrene unit of the structure

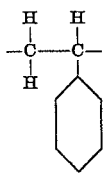

and $x$ is a number, the vinylidene cyanide units being derived from the monomeric vinylidene cyanide which is a liquid at room temperature and a crystalline solid at 0° C. having a melting point when in purest form of substantially 9.0 to 9.7° C. and being characterizable chemically by the ability to undergo on contact with water at room temperature an instantaneous homopolymerization reaction to give a solid, water-insoluble resin, said copolymer being a resinous, heat softenable solid which is soluble at room temperature in dimethyl formamide, but which is insoluble at room temperature in each of alcohol, benzene and ether.

FLOYD F. MILLER.

REFERENCES CITED

The following references are of record in the file of this patent:

UNITED STATES PATENTS

| Number | Name | Date |
|---|---|---|
| 2,466,395 | Dickey | Apr. 5, 1949 |